United States Patent
Tanaka et al.

(10) Patent No.: US 6,795,323 B2
(45) Date of Patent: Sep. 21, 2004

(54) THREE-LEVEL NEUTRAL POINT CLAMPING PWN INVERTER AND NEUTRAL POINT VOLTAGE CONTROLLER

(75) Inventors: Yoshiyuki Tanaka, Fukuoka (JP);
Katsutoshi Yamanaka, Fukuoka (JP);
Eiji Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/433,891

(22) PCT Filed: Nov. 30, 2001

(86) PCT No.: PCT/JP01/10480
§ 371 (c)(1),
(2), (4) Date: Jun. 7, 2003

(87) PCT Pub. No.: WO02/50989
PCT Pub. Date: Jun. 27, 2002

(65) Prior Publication Data
US 2004/0057262 A1 Mar. 25, 2004

(30) Foreign Application Priority Data

Dec. 7, 2000 (JP) ........................................ 2000-372889
Dec. 14, 2000 (JP) ........................................ 2000-380915

(51) Int. Cl.[7] ........................... H02M 1/12; H02M 7/537
(52) U.S. Cl. ........................ 363/41; 363/56.02; 363/132
(58) Field of Search ............................. 363/40, 41, 50, 363/56.01, 56.02, 131, 132

(56) References Cited

U.S. PATENT DOCUMENTS

| | | | | |
|---|---|---|---|---|
| 4,443,841 A | * | 4/1984 | Mikami et al. | ................ 363/41 |
| 4,670,828 A | * | 6/1987 | Shekhawat et al. | ...... 363/56.04 |
| 5,459,655 A | * | 10/1995 | Mori et al. | .................. 363/132 |
| 5,684,688 A | * | 11/1997 | Rouaud et al. | ............. 363/132 |
| 5,790,396 A | | 8/1998 | Miyazaki et al. | |
| 5,910,892 A | * | 6/1999 | Lyons et al. | ................... 363/98 |
| 5,953,222 A | * | 9/1999 | Mizutani | .................. 363/56.05 |
| 5,982,646 A | * | 11/1999 | Lyons et al. | ................... 363/58 |
| 6,058,031 A | | 5/2000 | Lyons et al. | |
| 6,084,788 A | * | 7/2000 | Mizutani | .................. 363/56.12 |
| 6,219,265 B1 | * | 4/2001 | Bernet et al. | ................ 363/137 |
| 6,392,907 B1 | * | 5/2002 | Ichikawa | ...................... 363/98 |

FOREIGN PATENT DOCUMENTS

| | | |
|---|---|---|
| EP | 969587 A | 1/2000 |
| JP | 2-261063 | 10/1990 |
| JP | 5-292754 | 11/1993 |
| JP | 9-37592 | 2/1997 |
| JP | 9-308252 | 11/1997 |
| JP | 10-257780 A | 11/1997 |
| JP | 11-122944 A | 4/1999 |
| JP | 2000-308368 A | 11/2000 |
| JP | 2001-57784 | 2/2001 |
| JP | 2001-61283 | 3/2001 |

* cited by examiner

*Primary Examiner*—Adolf Berhane
(74) *Attorney, Agent, or Firm*—Sughrue Mion, PLLC

(57) ABSTRACT

On the basis of: a first calculated value ic which is a product of a calculated value of a time of three-phase output voltages in a state where a positive bus, a negative bus, and a neutral line are connected respectively to three-phase phase output terminals, and a predicted neutral current value in the state; and second and third calculated values icx and icy which are products of a calculated value of a time of the three-phase output voltages that can take state 1 where two of the three-phase phase output terminals are connected to the positive bus or the neutral line, and a remaining one terminal is connected to the neutral line or the negative bus, and state 2 opposite to the state, and predicted neutral current values in states 1 and 2, a time ratio of state 1 and 2 during a PWM period is determined so as to make a current flowing through the neutral line close to zero, or a potential of the neutral line of the three-phase output voltages close to a voltage which is exactly the middle between voltages of the positive and negative busses.

11 Claims, 8 Drawing Sheets

POO

ONN

PPO

OON

OPO

NON

OPP

NOO

OOP

NNO

POP
FIG. 2(ℓ) 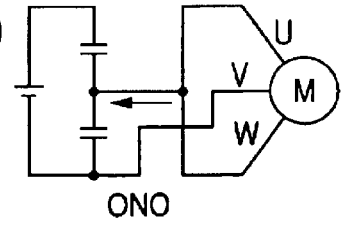
ONO

PON

NPO

ONP

OPN

NOP

PNO

THREE-LEVEL NEUTRAL POINT CLAMPING PWN INVERTER AND NEUTRAL POINT VOLTAGE CONTROLLER

TECHNICAL FIELD

The present invention relates to a three-level neutral-point-clamped PWM inverter apparatus which is one of a power converter such as an inverter or a servo drive that speed-variably drives a motor, and a power converter that interconnects systems, and also to a neutral voltage controller which is used in such a three-level neutral-point-clamped PWM inverter to control a neutral voltage that is a voltage between a neutral point of two capacitors connected in series between positive and negative busses of the apparatus, and the negative bus.

BACKGROUND ART

FIG. 1 is a circuit diagram showing the main circuit configuration of a three-level neutral-point-clamped PWM inverter apparatus. As shown in FIG. 1, the three-level neutral-point-clamped PWM inverter apparatus is configured by two capacitors 7, three-phase output terminals, twelve switching elements 8, and eighteen diodes 9.

In the thus configured three-level neutral-point-clamped PWM inverter apparatus, when switching elements $8_1$, $8_2$ are turned on, the output terminals of the phases are connected to a positive bus which is connected to a point P, and output phase voltages of the phases are at a high level. When switching elements $8_2$, $8_3$ are turned on, the output terminals of the phases are connected to a point C which is the neutral point, and the output phase voltages of the phases are at an intermediate level (neutral voltage) which is between the high level and a low level. When switching elements $8_3$, $8_4$ are turned on, the output terminals of the phases are connected to a negative bus which is connected to a point N, and the output phase voltages of the phases are at the low level. In the three-level neutral-point-clamped PWM inverter apparatus, usually, the switching elements 8 are switched on the basis of the above-mentioned three patterns to drive a three-phase load.

In such a three-level neutral-point-clamped PWM inverter apparatus, the neutral voltage is obtained by voltage division of the capacitors 7. The neutral voltage is varied in accordance with a current supplied to the load. When the neutral voltage is varied, an excess voltage is applied to the capacitors 7, thereby causing the possibility that the capacitors 7 are shortened in life or broken. In a three-level neutral-point-clamped PWM inverter apparatus, therefore, a neutral voltage control is performed in order to suppress or control variation of the neutral voltage.

In a neutral voltage control of the thus configured neutral-point-clamped PWM inverter, conventionally, the current flowing through the neutral line is controlled by using dipolar modulation or unipolar modulation as a method of generating PWM pulses, and increasing and decreasing the zero-sequence voltage of a voltage command.

On the other hand, as disclosed in JP-A-5-292754, when the concept of a voltage vector is introduced and a PWM control is performed, a method is usually employed in which a neutral voltage control is performed while the increasing or decreasing direction of an intermediate voltage vector is determined from the sign of a load power. As proposed in JP-A-2001-57784, such a method includes that in which a generation time ratio of a correction vector is finely adjusted in accordance with the direction of a current flowing through a neutral line.

In these methods, variation of the neutral voltage is suppressed by, among twelve sets of switch states such as shown in FIG. 2, adjusting the ratio of paired switch states in which the output voltages are equal to each other but the current directions of the neutral line are opposite to each other.

As proposed in JP-A-2001-61283, there is also a method such as shown in FIG. 3 in which a switch state disturbing the neutral voltage is suppressed. When switch states which can be attained by a neutral-point-clamped PWM inverter are indicated in the form of output voltage vectors, they can be expressed as shown in FIG. 4.

FIG. 5 shows an example of an apparatus which calculates a PWM pulse of a neutral-point-clamped PWM inverter with using the concept of a space voltage vector. The apparatus comprises a vector time calculator 102, a vector time register 103, a PWM pulse pattern setting device 104, and a parameter setting device 105.

In the apparatus, it is assumed that an output voltage output from the inverter is a space vector quantity such as shown in FIG. 4. When the modulation rate (k) and phase (θ) of an output voltage V are given, the vector time calculator 102 outputs the region of the output voltage vector V to the PWM pulse pattern setting device 104, selects the 27 kinds of vectors shown in FIG. 4, and calculates vector sequences which are sequentially output and vector output times (T0–T5) as PWM pulses in which an average of PWM periods is equal to the output voltage vector V. The vector sequences and the vector output times (T0–T5) are stored in the vector time register 103. The vector sequences and vector output times which are stored are converted by the PWM pulse pattern setting device 104 to a pulse sequence of U1, U2, V1, V2, W1, and W2 which drive switch elements of an inverter main circuit. The switch elements of the inverter main circuit are turned on/off by the pulse sequence, and a desired voltage is output. In this apparatus, on the basis of the neutral voltage from the parameter setting device 105 and a signal from a detector for a load power factor, the PWM pulse pattern setting device 104 adjusts the generation time of the correction vector in a direction along which the variation of the neutral voltage is reduced.

JP-A-9-37592 discloses a method of PWM controlling a three-level inverter in which a region between one long vector of output space vectors of a three-level inverter, and a vector that is adjacent to the long vector, and that has an intermediate length is set as one space. The whole space of 360° which is formed by these vectors is divided into twelve regions. The region number of a command vector in the twelve regions is judged depending on the rotation angle of the command vector. The modulation rate is calculated in accordance with the degree of the command vector. The transmission system and the transmission sequence for suppressing variation of the neutral voltage of voltage dividing capacitors of the three-level inverter are determined in accordance with the modulation rate and the current ratio. Specific output times of the vectors in the transmission system and the transmission sequence are calculated to PWM control the three-level inverter.

As described above, in a three-phase neutral-point-clamped PWM inverter, usually, an even number of capacitors are directly connected between positive and negative busses of a main circuit in order to obtain the neutral voltage, and a neutral line is used while being taken out from a capacitor terminal which has a voltage that is exactly the middle voltage between the positive and negative busses. The neutral line is connected as shown in FIGS. 2 and 3 depending on the output load of the PWM inverter and the switch states of the PWM inverter. The voltage of the neutral line (the neutral voltage) is varied in accordance with the current which charges the capacitors through the positive and negative busses, and that which is supplied from the connected load.

As shown in the conventional art examples, in the switch states shown in FIG. 3 (in the description, the vector is referred to as a correction vector), a set of switch states in which the line voltage to be output to the load is the same but the phase of the load connected to the neutral line is different (adjacent switch states in FIG. 2 are bundled into one set) is used, and the time ratio in which the switch states of the set are generated is adjusted, whereby the neutral potential can be finely controlled.

In the switch states shown in FIG. 2 (in the description, the vector is referred to as an intermediate vector), however, the neutral voltage is varied by the phase currents of the load connected to the neutral line and the time ratio in which the switch state is generated, and there is no vector which corrects the variation. Therefore, the variation of the neutral voltage caused by an intermediate vector must be corrected with using a correction vector.

As shown in JP-A-2-261063, therefore, a zero-sequence voltage is added to the modulation rate, the occurrence time of a correction vector is adjusted, and the variation of the neutral voltage is controlled without changing the output line voltage which is to be supplied to a load. As shown in JP-A-5-292754 and JP-A-2001-57784, also in the method which uses the concept of a space voltage vector, an output is conducted so that a correction vector is used in a voltage vector to be used, and the occurrence time of the switch state of the set is adjusted to control the neutral voltage. In these methods, however, the technique of determining the ratio of the correction vector to make the neutral voltage variation close to zero is not optimum, and the effect of suppressing the neutral voltage variation is insufficient.

In the method described in JP-A-9-37592, the transmission system and the transmission sequence for suppressing variation of the neutral potential of the voltage dividing capacitors of the predetermined three-level inverter are determined in accordance with the modulation rate and the current ratio, and specific output times of the vectors in the transmission system and the transmission sequence are calculated to perform a PWM control. Therefore, it is possible to bring the neutral current close to zero. In the method also, however, the neutral voltage variation cannot be reduced completely to zero.

FIG. 6 is a block diagram showing the configuration of a conventional neutral voltage controller which detects the level of the neutral voltage and outputs a neutral voltage control command for suppressing the neutral voltage variation. As shown in FIG. 6, the conventional neutral voltage controller is configured by two isolation amplifiers 6 and a calculation circuit 3.

A first reference voltage $V_{ref1}$ which is one half of a voltage $V_{PN}$ (DC bus voltage) between the point P and the point N, and a voltage between the point C and the point N, i.e., the neutral voltage $V_{CN}$ are input to the two isolation amplifiers 6, respectively. The calculation circuit 3 receives outputs of the two isolation amplifiers 6, calculates a neutral voltage control command for making the neutral voltage VCN and the first reference voltage $V_{ref1}$ coincident with each other, and outputs the command. The neutral voltage control command is a command to produce an output pattern of a PWM (Pulse Width Modulation) command for raising or lowering the value of the neutral voltage.

As described above, in the neutral voltage controller, the neutral voltage VCN and the first reference voltage $V_{ref1}$ are input to the calculation circuit 3, and hence the two isolation amplifiers 6 serving as insulation circuits are required. Such insulation circuits are required because the calculation circuit 3 is usually driven by a power source which is different from that for the main circuit of the inverter.

However, the isolation amplifiers 6 are expensive analog insulation circuits having a wide linear characteristic, and therefore have a problem in that the neutral voltage controller is expensive. In the conventional neutral voltage controller, since the calculation circuit 3 controls the neutral voltage on the basis of analog signals, there is a problem in that the apparatus is easily affected by noises or the like.

DISCLOSURE OF THE INVENTION

It is an object of the invention to provide a three-phase neutral-point-clamped PWM inverter apparatus in which the neutral potential variation can be efficiently suppressed, and the safety and the quality of the output voltage can be improved.

In order to attain the object, in the three-phase neutral-point-clamped PWM inverter apparatus of the invention, a first calculated value which is a product of: a calculated value of a time of three-phase output voltages in a state where a positive bus, a negative bus, and a neutral line are connected respectively to three-phase phase output terminals; and a predicted neutral current value in the state is obtained. Moreover, second and third calculated values which are products of: a calculated value of a time of the three-phase output voltages that can take state 1 where two of the three-phase phase output terminals are connected to the positive bus or the neutral line, and a remaining one terminal is connected to the neutral line or the negative bus, and state 2 opposite to the state; and predicted neutral current values in states 1 and 2 are obtained. Furthermore, on the basis of the first, second, and third calculated values, a time ratio of state 1 and 2 during a PWM period is determined so as to make a current flowing through the neutral line close to zero, or a potential of the neutral line of the three-phase output voltages close to a potential which is exactly the middle between voltages of the positive and negative busses.

According to the configuration, the neutral potential variation can be efficiently suppressed by making close to zero as far as possible, or making the potential of the neutral line close to a potential which is exactly the middle between the potentials of the positive and negative busses. Therefore, the safety and the quality of the output voltage can be improved.

It is another object of the invention to provide a neutral voltage controller which is economical, and highly reliable and accurate.

In order to attain the object, in the invention, a first reference voltage value which is one half of a voltage between a positive bus and a negative bus is subtracted from a value of a neutral voltage, when a result of the subtraction is smaller than a second reference voltage value which is a negative value, a signal for raising the neutral voltage is turned on, when the result of the subtraction is larger than a third reference voltage value which is a positive value, a signal for lowering the neutral voltage is turned on, the two signals are converted in an insulative manner to a 2-bit digital signal, and a neutral voltage control command is calculated on the basis of the digital signal and then output.

According to the configuration, the differences between the neutral voltage and the reference voltage values are expressed by a digital signal instead of an analog signal, thereby enabling economical insulating means to be used without using expensive insulating means having a wide linear characteristic. Therefore, the whole apparatus can be economically configured. Since the differences between the neutral voltage and the reference voltage values are processed in the form of a digital signal instead of an analog signal, an influence of noises on an input to calculating means can be reduced. Therefore, it is possible to provide a neutral voltage controller in which the reliability is enhanced, and which is highly accurate.

BRIEF DESCRIPTION OF THE DRAWINGS

FIGS. 2(a) to 2(l) shows the diagrams showing an example of sets of switch states of a three-phase neutral-point-clamped inverter;

BEST MODE FOR CARRYING OUT THE INVENTION

Figure 1:
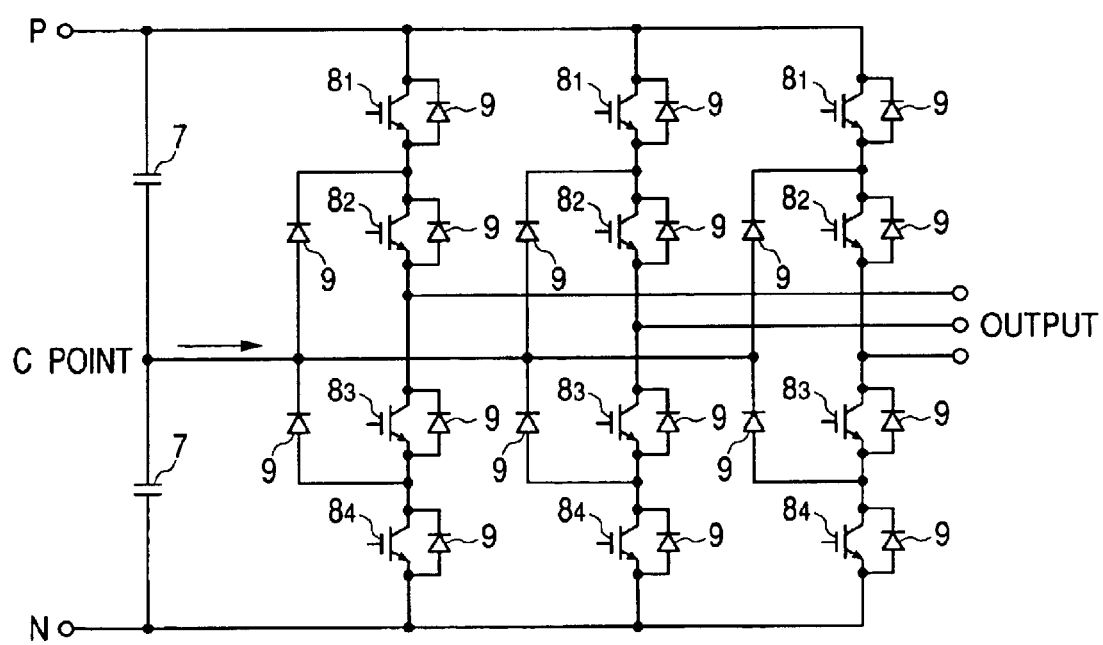
FIG. 1 is a circuit diagram showing a main circuit configuration of a three-level inverter apparatus.
Figure 2A:
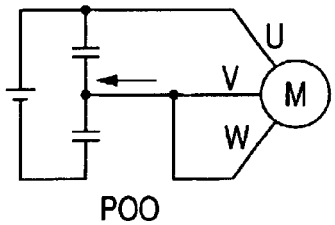
Figure 2G:
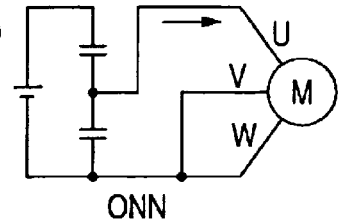
Figure 2B:
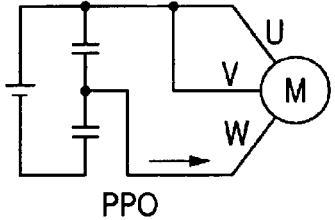
Figure 2H:
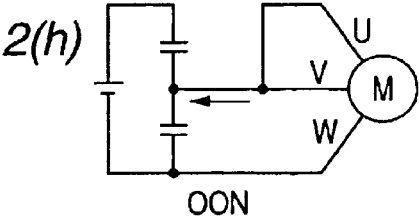
Figure 2C:
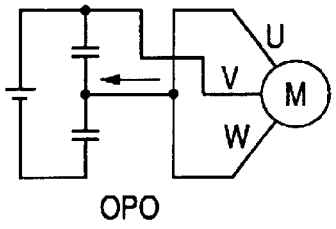
Figure 2I:
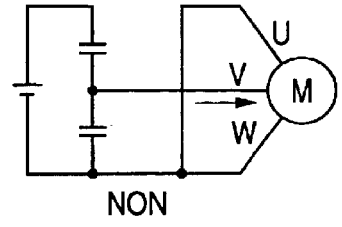
Figure 2D:
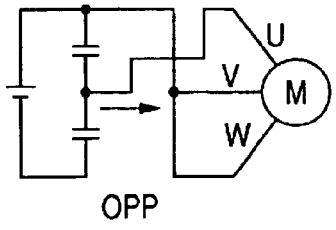
Figure 2J:
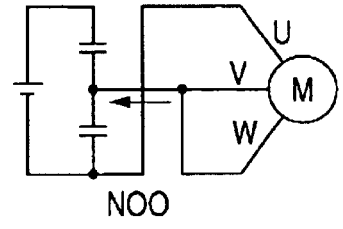
Figure 2E:
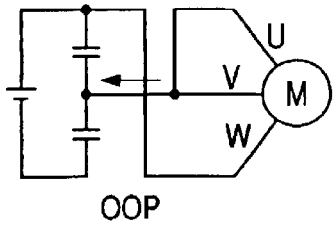
Figure 2K:
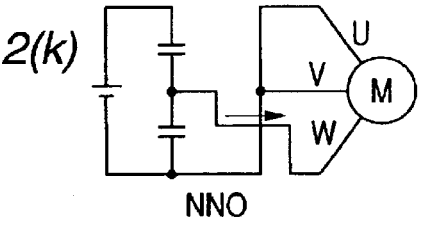
Figure 2F:
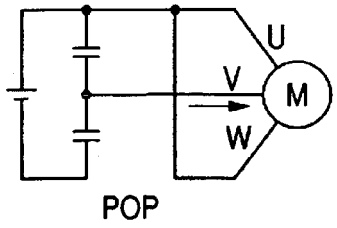
Figure 3A:
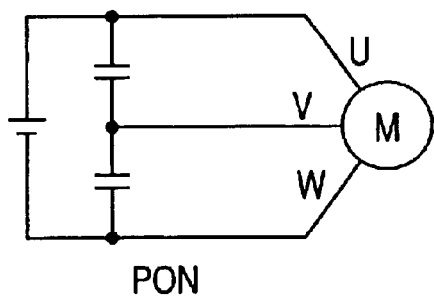
FIGS. 3(a) to 3(f) show the diagrams showing an example of other sets of switch states of the three-phase neutral-point-clamped inverter.
Figure 3B:
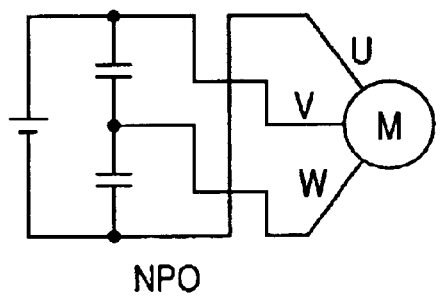
Figure 3C:
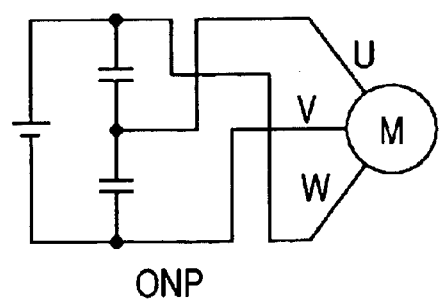
Figure 3D:
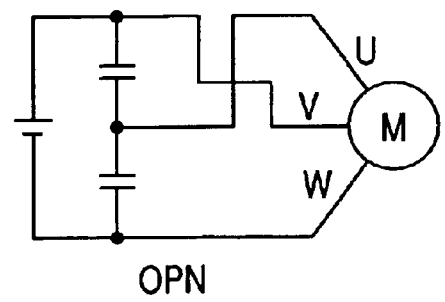
Figure 3E:
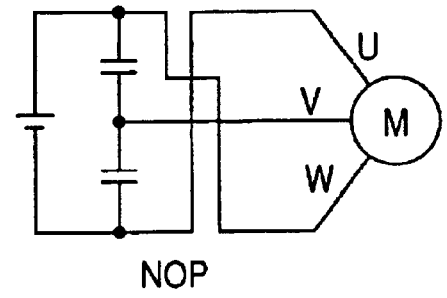
Figure 3F:
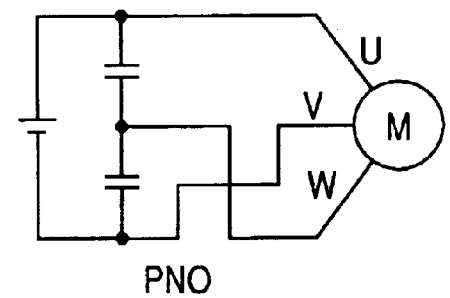

Hereinafter, preferred embodiments of the invention will be described with reference to the drawings. In the drawings, the same reference numerals denote the identical components.

First Embodiment

Figure 7:
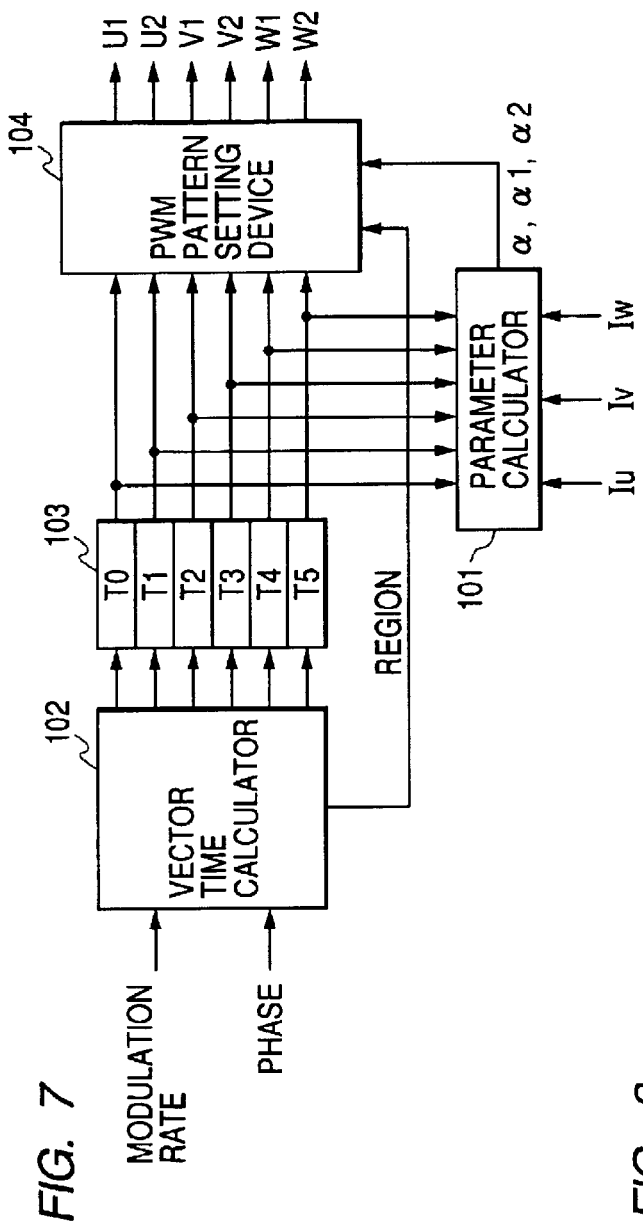
FIG. 7 is a block diagram showing the configuration of a PWM pulse calculator of a three-phase neutral-point-clamped inverter of a first embodiment of the invention.

Next, a three-phase neutral-point-clamped PWM inverter apparatus of a first embodiment of the invention will be described with reference to FIG. 7. FIG. 7 is a block diagram showing the configuration of a PWM pulse calculator of a three-phase neutral-point-clamped inverter apparatus of the embodiment. As shown in FIG. 7, the three-phase neutral-point-clamped inverter apparatus of the embodiment comprises a neutral potential control parameter calculator 101, a vector time calculator 102, a vector time register 103, and a PWM pattern setting device 104.

Figure 4:
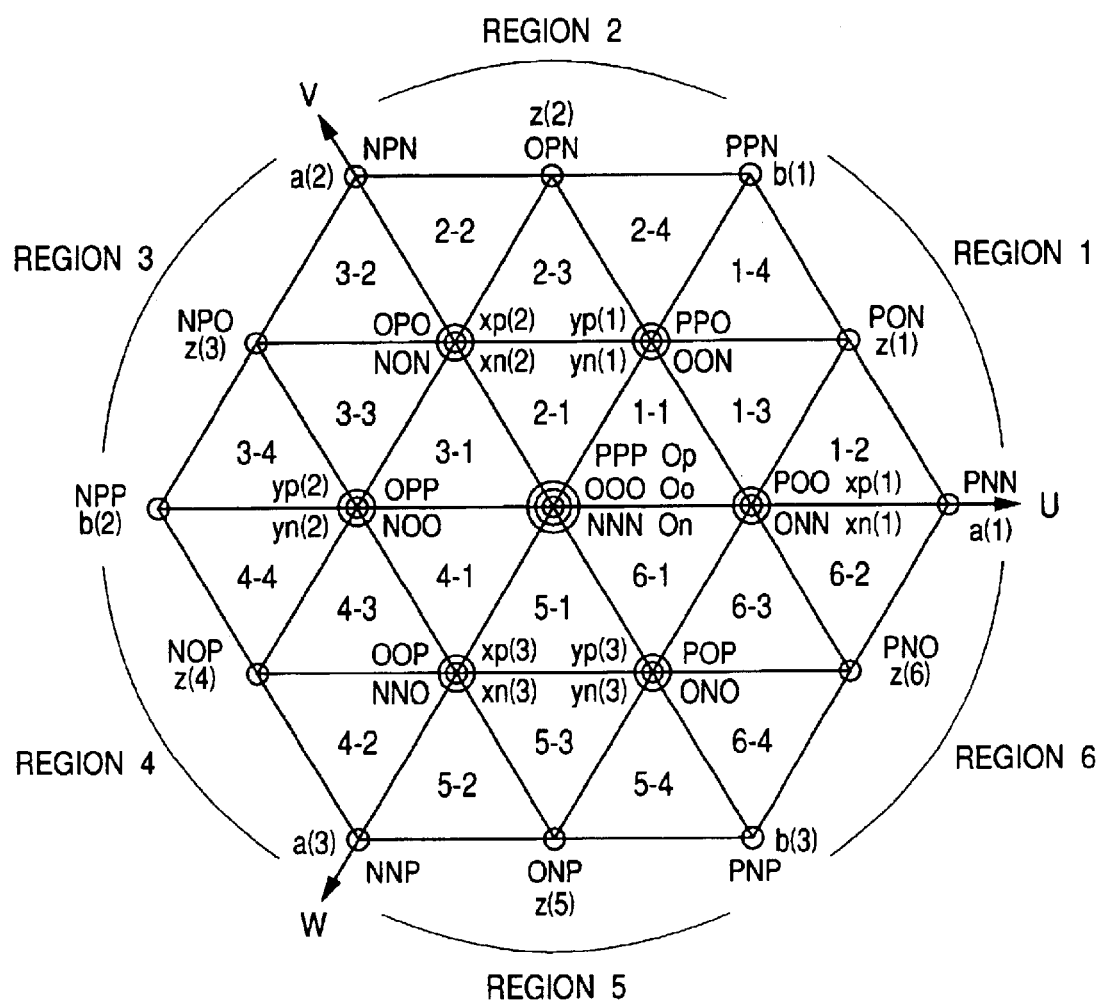
FIG. 4 is a diagram of output voltage space vectors of a three-phase neutral-point-clamped inverter.
Figure 5:
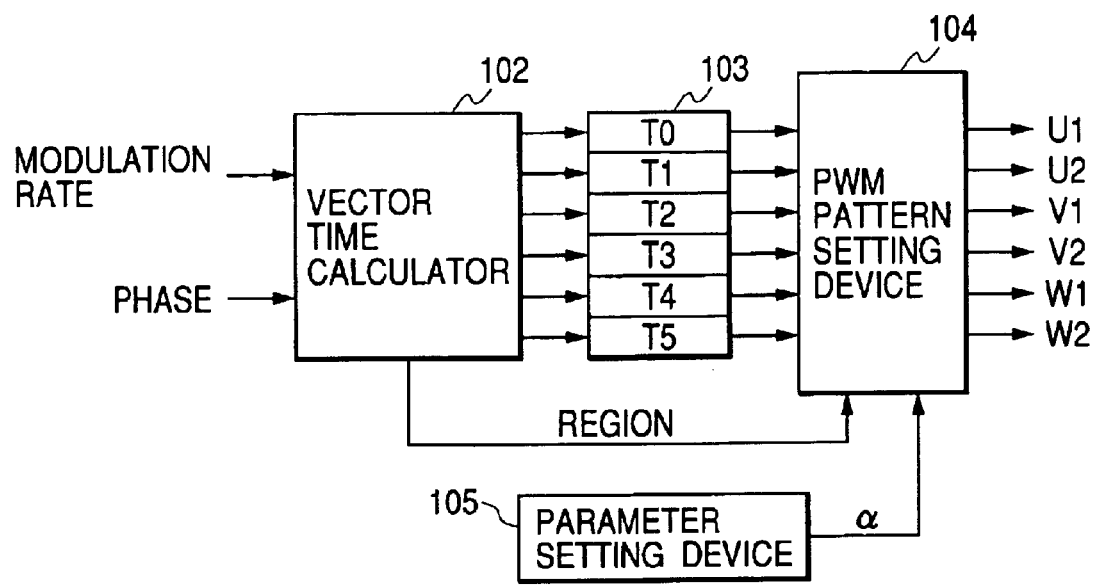
FIG. 5 is a block diagram of a conventional PWM pulse calculation circuit.
Figure 6:
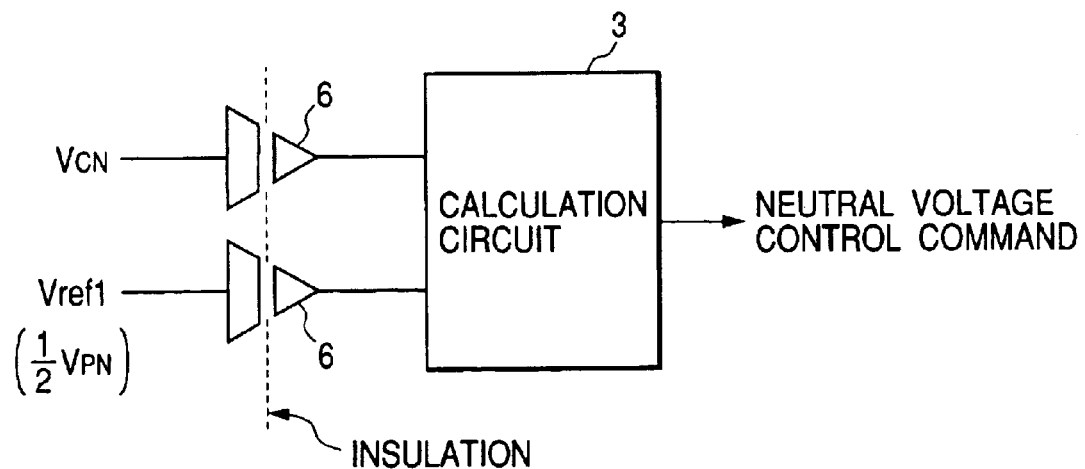
FIG. 6 is a block diagram showing the configuration of a conventional neutral voltage controller.

When the three-phase neutral-point-clamped inverter apparatus of the embodiment is to output an output voltage vector V, PWM pulses are output on the basis of vectors constituting the regions (regions 1 to 6) where the output voltage vector V exists, shown in FIG. 4. Assuming that the vectors constituting the regions are sorted as shown in FIG. 4, the vector time calculator 102 calculates total output times of the sorted vectors to output the output voltage vector V, as follows:

| | |
|---|---|
| total output time of zero-voltage vector | T0 |
| total output time of xp and xn vectors | T1 |
| total output time of z vector | T2 |
| total output time of yp and yn vectors | T3 |
| total output time of a vector | T4 |
| total output time of b vector | T5. |

The currents of the neutral line due to outputs of the vectors are indicated as follows:

neutral current due to output of z vector: ic neutral current due to output of xp and xn vectors: icx neutral current due to output of yp and yn vectors: icy.

Measured values of U-, V-, and W-phase load current instantaneous values are indicated by i(U), i(V), and i(W), respectively. When the vectors are in the respective regions, i(phase1), i(phase2), and i(phase3) are changed respectively to i(U), i(V), and i(W) as shown in Table 2. Therefore, the neutral currents can be calculated by the following expressions. In the expressions, phase1 is the phase when xp and xn vectors are output, phase2 is the phase when z vector is output, and phase3 is the phase when yp and yn vectors are output.

$ic = i(\text{phase2}) \times T2$ $icx = i(\text{phase1}) \times T1$ $icy = i(\text{phase3}) \times T3$ When the neutral currents ic, icx, and icy are obtained in this way, the neutral potential variation can be made close to zero be determining the time ratios of xp and xn, and yp an yn vectors so that the current variation of the neutral line is made close to zero by using ic, icx, and icy.

Hereinafer, an example of a specific method of calculating the time ratios of the vectors will be described.

As described in JP-A-2001-57784, the parameter setting device 105 uses neutral potential control parameters ($\alpha$, $\alpha 1$, and $\alpha 2$ in the neutral potential control. Relationships among the parameters are changed depending on relationships between the region where the voltage vector exists and the phase currents in the following manner:

when $i(\text{phase1}) \geq 0$, $\alpha 1 = \alpha$ when $i(\text{phase1}) < 0$, $\alpha 1 = 1 - \alpha$ when $i(\text{phase3}) \geq 0$, $\alpha 2 = 1 - \alpha$ when $i(\text{phase3}) < 0$, $\alpha 2 = \alpha$ (Note: a phase current which is directed from the inverter to a motor is positive.)

Table 1 below shows the correspondence among phase1, phase2, and phase3, and the U-, V-, and W-phases.

TABLE 1

Correspondence Table of Phases

| Region | phase1 | phase2 | phase3 |
|---|---|---|---|
| 1 | U | V | W |
| 2 | V | U | W |
| 3 | V | W | U |
| 4 | W | V | U |
| 5 | W | U | V |
| 6 | U | W | V |

Then, the time allocations of xp and xn vectors are set as follows:

time of xp vector: $Txp = \alpha 1 \times T2$ time of xn vector: $Txn = (1 - \alpha 1) \times T2$, and the time allocations of yp and yn vectors are set as follows:

time of yp vector: $Typ = \alpha 2 \times T3$ time of yn vector: $Tyn = (1 - \alpha 2) \times T3$.

The neutral potential control parameter α is calculated by a neutral potential control parameter calculator 106 as a sum of two parameters α' and α" as follows:

$$\alpha = \alpha' + \alpha" \quad (0 \leq \alpha \leq 1).$$

It is assumed that α is limited to a range of 0 or more to 1 or less.

Here, α' is calculated in the following manner:

$$D = \gamma / (2 \times \beta)$$

α'=D (when ic≥0)
α'=−D (when ic<0)
(also α' is limited to a range of 0 or more to 1 or less).

Furthermore, α" is an offset adjustment parameter, and assumed to be used for compulsively controlling the neutral potential in the case of an abnormal neutral potential or the like, and to be usually 0.5.

Moreover, β and γ are obtained in the manner shown in (1) to (4) below.

(1) When $|ic|<|icx|\leq|icy|$ or $|ic|<|icy|\leq|icx|$, α' is calculated while setting γ=ic and β=|icx|+|icy|.

(2) When $|icx|\leq|ic|\leq|icy|$ or $|icx|\leq|icy|\leq|ic|$, α' is calculated while setting γ=|ic|−|icx| and β=|icy|.

However, α1 is separately set in the following manner:
  when icx and ic have the same sign,
    α1=1 is fixed, and
  when icx and ic have different signs,
    α1=0 is fixed.

(3) When $|icy|\leq|ic|\leq|icx|$ or $|icy|\leq|icx|\leq|ic|$, α' is calculated while setting γ=|ic|−|icy| and β|icx|.

However, α2 is separately set in the following manner:
  when icx and ic have the same sign,
    α2=0 is fixed, and
  when icy and ic have different signs,
    α2=1 is fixed.

(4) When $|icx|+|icy|\leq|ic|$,
  when icx and ic have the same sign,
    α1=1 is fixed,
  when icx and ic have different signs,
    α1=0 is fixed,
  when icy and ic have the same sign,
    α2=0 is fixed, and
  when icy and ic have different signs,
    α2=1 is fixed.

When the neutral potential control parameter α is calculated in this way, the neutral potential variation due to the neutral current which is caused to flow by z vector can be made close to zero as far as possible for each PWM period, by efficiently using the neutral current which is caused to flow by xp, xn, yp, and yn vectors.

Also in the method in which generation of z vector is suppressed as in the method described in JP-A-2001-061283, when T2 in the above calculation is set as the time elapsed after generation of the vector is suppressed, the neutral potential variation can be efficiently suppressed while maintaining the above calculation as it is.

In the three-phase neutral-point-clamped PWM inverter apparatus of the embodiment, in consideration of the case where ic is so large that compensation cannot be completely attained during the PWM period depending on the operation conditions of the inverter, such as the case of $|icx|+|icy|\leq|ic|$, compensation is performed in a slightly excessive degree when $$|icx|+|icy|\geq|ic|, |icx|\geq|ic|, \text{ and } |icy|\geq|ic|$$

are caused.

In order to realize the above, in the three-phase neutral-point-clamped PWM inverter apparatus of the embodiment, a change may be made so as to compensate the integral value of a current which has flown through the neutral line up to now, instead of compensation of the neutral current which is caused to flow by z vector during a PWM period. Specifically, a change may be made so that ic uses a sum of a time integral value ic0 of a neutral current which has flown before the previous period, and the neutral current i(phase2) caused by z vector in the next PWM period, as indicated by the following expression:

$$ic = ic0 + i(\text{phase2}) \times T2.$$

According to the configuration, it is possible to suppress the neutral potential variation which has not been sufficiently suppressed during one period. The time integral value ic0 of the neutral current may be measured by a current sensor disposed on the neutral line, or calculated by prediction based on the phase output currents coupled to the neutral line.

In the case where the capacitances of series-connected smoothing capacitors are equal to one another, when the neutral current is made close to zero as in the three-phase neutral-point-clamped PWM inverter apparatus of the embodiment, the neutral potential variation can be made zero, and the neutral potential can be controlled to the potential (the potential is indicated by V0) which is exactly the middle between the potentials of the positive and negative busses. In the case where the capacitances of the series-connected capacitors are made different from one another as a result of deterioration with time, even when the neutral current is made close to zero, however, the neutral potential cannot be controlled to become the potential which is exactly the middle between the potentials of the positive and negative busses.

In the invention, therefore, instead that the neutral current is made close to zero from the calculated values of ic, icx, and icy, the neutral current may be controlled so that the currently is conversely increased so as to be close to V0. In this case, the neutral potential control parameter calculator 101 detects the level of the neutral potential. If the potential is higher than V0, the neutral current can be increased from the calculated values of ic, icx, and icy in the direction of the arrow in FIG. 1, and, if the potential is lower than V0, the neutral current can be increased in the direction opposite to that of the arrow in FIG. 1.

Second Embodiment

Figure 8:
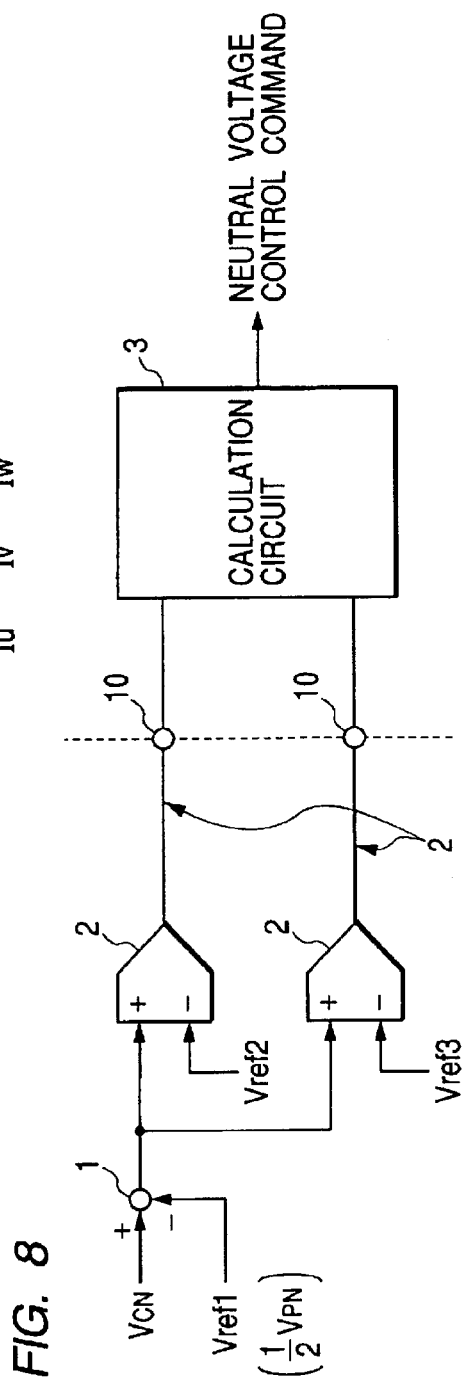
FIG. 8 is a block diagram showing the configuration of a neutral voltage controller of a second embodiment of the invention.

The second neutral voltage controller of the invention will be described. FIG. 8 is a block diagram showing the configuration of the neutral voltage controller of the embodiment. As shown in FIG. 8, the neutral voltage controller of the embodiment is configured by a subtracter 1, two comparators 2, a calculation circuit 3, and insulation circuits 10.

The subtracter 1 outputs a value which is obtained by subtracting the first reference voltage $V_{ref1}$ from the neutral voltage $V_{CN}$. As described above, the first reference voltage value $V_{ref1}$ is one half ($\frac{1}{2} \cdot V_{PN}$) of the voltage between the point P and the point N.

Figure 9:
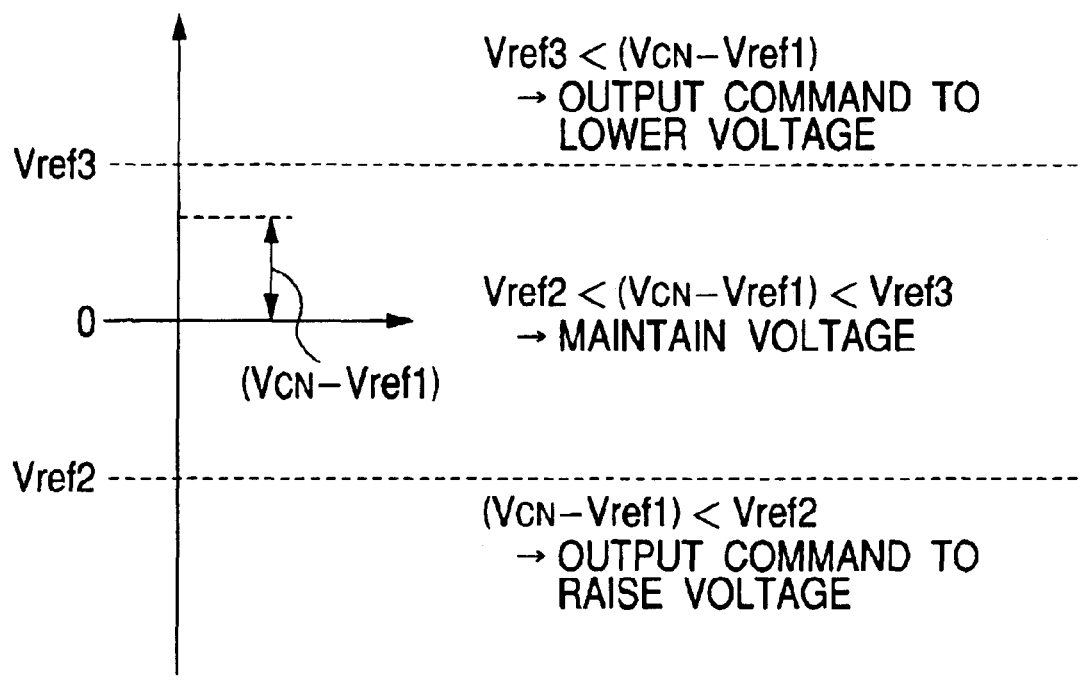
FIG. 9 is a view showing an operation of a neutral voltage controller of a third embodiment of the invention.

In the neutral voltage controller of the embodiment, in addition to the first reference voltage value $V_{ref1}$, a second reference voltage value $V_{ref2}$ and a third reference voltage value $V_{ref3}$ are used. As shown in FIG. 9, the second reference voltage value $V_{ref2}$ and the third reference voltage value $V_{ref3}$ are negative and positive values, respectively.

One of the comparators 2 turns on a signal for raising the neutral voltage and outputs the signal to the calculation circuit 3 when the value of the output of the subtracter 1 is smaller than the second reference voltage value $V_{ref2}$. The other comparator 2 turns on a signal for lowering the neutral voltage $V_{CN}$ and outputs the signal to the calculation circuit 3 when the value of the output of the subtracter 1 is larger than the third reference voltage value $V_{ref3}$.

The signals output from the two comparators 2 are input to the insulation circuits 10 as a 2-bit digital signal, and then input to the calculation circuit 3. Since the insulation circuits 10 are circuits which handle a digital signal, the circuits are not required to have a linear characteristic and the like in a wide range. Therefore, the insulation circuits can be configured more economically than the isolation amplifiers 6 shown in FIG. 2.

The calculation circuit 3 receives the outputs of the two comparators 2. When the signals from the two comparators 2 are not input, the circuit maintains the neutral voltage as it is. When the signal for raising the neutral voltage is input, the circuit produces a neutral voltage control command for raising the neutral voltage. When the signal for lowering the neutral voltage is input, the circuit produces a neutral voltage control command for lowering the neutral voltage.

As described above, in the neutral voltage controller of the embodiment, the differences between the neutral voltage $V_{CN}$ and the reference voltage values are converted from the analog signals to a digital signal. Therefore, the economical insulation circuits 10 which handle a digital signal can be used without using expensive insulation circuits having a wide linear characteristic. As a result, the whole apparatus can be economically configured.

In the neutral voltage controller of the embodiment, the differences between the neutral voltage $V_{CN}$ and the reference voltage values are processed in the form of a digital signal instead of an analog signal. Therefore, an influence of noises on the input to the calculation circuit 3 can be reduced, so that the reliability of the apparatus can be enhanced, and a highly accurate neutral voltage control is enabled.

In the neutral voltage controller of the embodiment, a dead band is disposed with using the second reference voltage value $V_{ref2}$ and the third reference voltage value $V_{ref3}$ as thresholds, thereby allowing the neutral voltage control to be performed without being affected by noises of a small level which are contained in the neutral voltage. In the neutral voltage controller of the embodiment, moreover, it is preferable to set the thresholds due to the second reference voltage value $V_{ref2}$ and the third reference voltage value $V_{ref3}$ so as to be wider the neutral voltage variation which occurs at a frequency that is three times the frequency output by the three-level inverter apparatus. According to the configuration, the influence of noises can be eliminated, and a usual variation component, i.e., a variation component of a frequency which is thrice the operation frequency can be neglected. Therefore, simplification and high reliability of the control can be realized. The calculation circuit 3 may be configured by software, or by hardware such as an electric circuit.

Third Embodiment

Figure 10:
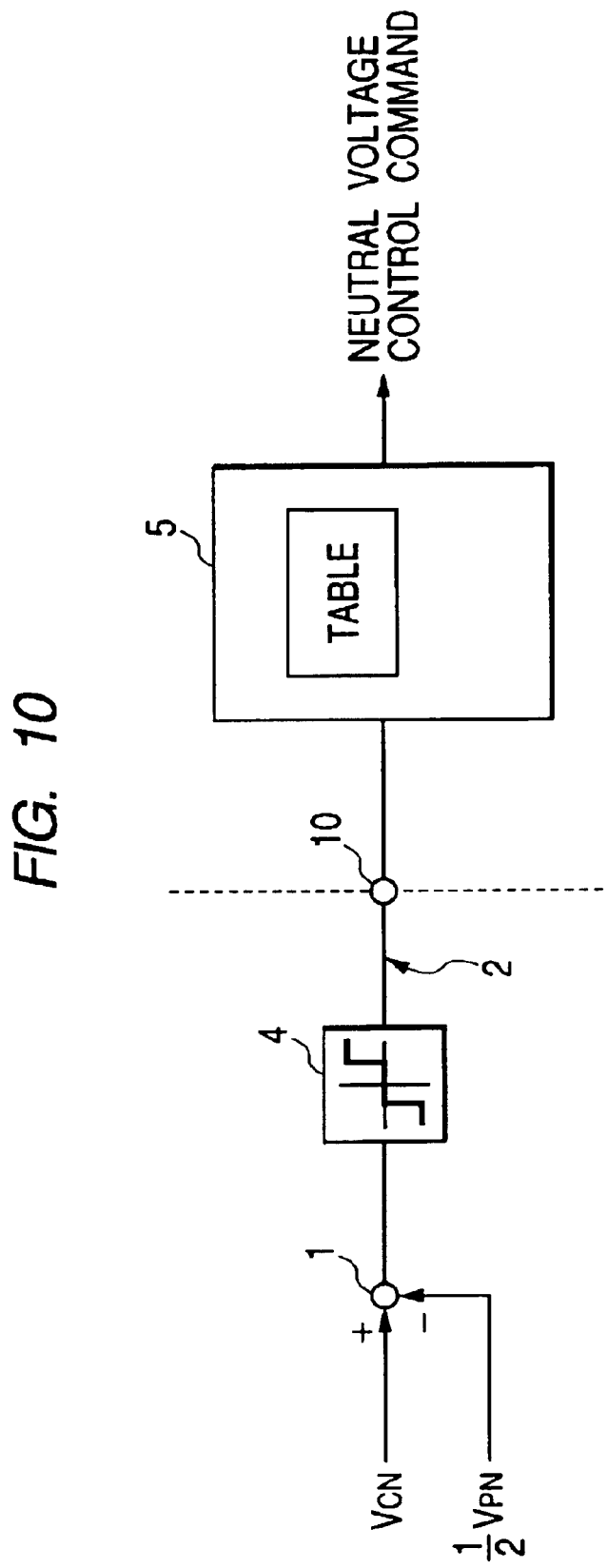
FIG. 10 is a block diagram showing the configuration of the neutral voltage controller of the third embodiment of the invention.

Next, a neutral voltage controller of a third embodiment of the invention will be described with reference to FIG. 10. FIG. 10 is a block diagram showing the configuration of the neutral voltage controller of the embodiment. As shown in FIG. 10, the neutral voltage controller of the embodiment is different from the neutral voltage controller of the above-described embodiment in that the controller comprises a comparator 4 in place of the two comparators 2, and a storage device 5 instead of the calculation circuit 3.

The comparator 4 receives a value which is obtained by subtracting the first reference voltage $V_{ref1}$ from the neutral voltage $V_{CN}$, and outputs three 2-bit digital signals which have different values in cases where the value of the output of the subtracter 1 is smaller than the second reference voltage value $V_{ref2}$, where the output value is equal to or larger than the second reference voltage value $V_{ref2}$ and equal to or smaller than the third reference voltage value $V_{ref3}$, and where the output value is larger than the third reference voltage value $V_{ref3}$.

The storage device 5 stores a plurality of tables of sets of values of the digital signals and neutral voltage control commands which are to be output at the values, in accordance with a motoring/regenerative operation of the inverter, or the operation status of the inverter according to the use status. The storage device 5 selects a table according to the present operation status, from the tables, and outputs a neutral voltage control command corresponding to a digital signal, with using the table.

Table 2 shows switching states and changes of the neutral voltage. The switching states are switching patterns in the case where a vector is to be output, such as shown in FIG. 4, and indicated in the sequence of the U-, V-, and W-phases. P indicates a state where the phase is connected to point P on the positive side, N indicates a state where the phase is connected to point N on the negative side, and O indicates a state where the phase is connected to neutral point C.

As apparent from FIG. 4, for example, ap vector and an vector are equivalent to each other as a line voltage to be output, but are different in switching state. With respect to a change of the neutral voltage in a motoring operation, for example, the change in the case of ap vector is rising, and that in the case of an vector is lowering, or the changes are opposite to each other. Also in motoring and regenerative operations, the changes of the neutral voltage are opposite to each other. In this way, there are sets of voltage vectors in which, even when the line voltage to be output is identical, the neutral voltage can be raised or lowered. Depending on which vector is selected, therefore, the neutral voltage can be controlled. In the neutral voltage controller of the embodiment, these relationships are stored in form of a table, so that, with respect to variation of the neutral voltage, a pattern which cancels the variation can be selected.

TABLE 2

| Voltage vector | Switching state | Change of neutral voltage | |
|---|---|---|---|
| | | Motoring | Regenerative |
| 0p | PPP | Unchanged | Unchanged |
| 0o | 000 | Unchanged | Unchanged |
| 0n | NNN | Unchanged | Unchanged |
| a | PNN, NPN, NNP | Unchanged | Unchanged |
| b | PPN, NPP, PNP | Unchanged | Unchanged |
| c | PON, OPN, NPO, NOP, ONP, PNO | Depending on phase | Depending on phase |
| ap | P00, 0P0, 00P | Raising | Lowering |
| bp | PP0, 0PP, P0P | Raising | Lowering |
| an | ONN, NON, NN0 | Lowering | Raising |
| bn | 00N, N00, 0N0 | Lowering | Raising |

What is claimed is:

1. A three-phase neutral-point-clamped PWM inverter apparatus which has a positive bus, a negative bus, and a neutral line, and in which neutral-point-clamped PWM inverters for three phases are disposed, each of said neutral-point-clamped PWM inverters being configured by: connecting in series first and second switch elements, and third and fourth switch elements between said positive bus and a phase voltage output terminal, and said negative bus and a phase output terminal, respectively; and connecting a node between said first and second switch elements, and a node between said third and fourth switch elements to said neutral point via respective clamp elements, characterized in that said apparatus comprises:

means for obtaining a first calculated value which is a product of: a calculated value of a time of three-phase output voltages in a state where said positive bus, said negative bus, and said neutral line are connected respectively to said three-phase phase output terminals during a PWM period; and a value of a current which is predicted to flow through said neutral point in said state;

means for obtaining a second calculated value which is a products of: a calculated value of a time of three-phase output voltages that can take a second state where two of said three-phase phase output terminals are connected to said positive bus, and one of said three-phase phase output terminals is connected to said neutral line, or a third state where two of said three-phase phase output terminals are connected to said neutral line, and one of said three-phase phase output terminals is connected to said negative bus; and a value of a current which is predicted to flow through said neutral line in said state;

means for obtaining a third calculated value which is a products of: a calculated value of a time of three-phase output voltages that can take a fourth state where one of said three-phase phase output terminals is connected to said positive bus, and two of said three-phase phase output terminals are connected to said neutral line, or a fifth state where one of said three-phase phase output terminals is connected to said neutral line, and two of said three-phase phase output terminals are connected to said negative bus; and a value of a current which is predicted to flow through said neutral line in said state; and ratio determining means for determining ratios of said second and third states, and said fourth and fifth states during a PWM period so as to, on the basis of said first, second, and third calculated values, make a current flowing through said neutral line close to zero, or a potential of said neutral line close to a potential which is exactly a middle between potentials of said positive and negative busses.

2. A three-phase neutral-point-clamped PWM inverter apparatus according to claim 1, wherein, in place of said ratio determining means set froth in claim 1, ratio determining means obtains a fourth calculated value which is a sum of said first calculated value, and an integral value of a current which has flown through said neutral line up to a PWM period preceding by one period, and determines ratios of said second and third states, and said fourth and fifth states during a PWM period so as to, on the basis of said second and third calculated values, make said fourth calculated value close to zero, or, with using said fourth calculated value, a potential of said neutral line close to a potential which is exactly a middle between potentials of said positive and negative busses.

3. A three-phase neutral-point-clamped PWM inverter apparatus according to claim 1, wherein, in a three-phase neutral-point-clamped PWM inverter apparatus in which a time of three-phase output voltages in six switch states where said positive bus, said negative bus, and said neutral line are connected respectively to said three-phase phase output terminals is suppressed to a first preset value or smaller, and an insufficient amount of an output voltage is compensated six switch states where each of said three-phase phase output terminals is connected to said positive bus or said negative bus, and excluding a state where all of three of said three-phase phase output terminals are concurrently connected to said positive bus or said negative bus, in place of said means for obtaining said first calculated value set froth in claim 1, means obtains a first calculated value which is a product of: the time of three-phase output voltages which are suppressed to said first preset value or smaller during a PWM period; and a value of a current which is predicted to flow through said neutral point in said state.

4. A three-phase neutral-point-clamped PWM inverter apparatus according to claim 3, wherein a measured value of a current flowing through said neural line is used in place of said current which is predicted to flow through said neutral point, and said ratio determining means obtains a fourth calculated value which is a sum of said first calculated value, and an integral value of a current which has flown through said neutral line up to a PWM period preceding by one period, and determines ratios of said second and third states, and said fourth and fifth states during a PWM period so as to, on the basis of said second and third calculated values, make said fourth calculated value close to zero, or, with using said fourth calculated value, a potential of said neutral line close to a potential which is exactly a middle between potentials of said positive and negative busses.

5. A three-phase neutral-point-clamped PWM inverter apparatus according to any one of claims 1 to 3, wherein, in said means for obtaining said first to third calculated values, said value of said current which is predicted to flow through said neutral point is calculated by using a value of a current which is predicted to flow through said phase output terminal connected to said neutral line.

6. A neutral voltage controller which controls a neutral voltage that is a voltage between a neutral point of two capacitors connected in series between positive and negative busses of a three-level inverter apparatus, and said negative bus, characterized in that said neutral voltage controller comprises:

subtracting means for outputting a value which is obtained by subtracting a first reference voltage value from a value of said neutral voltage, said first reference voltage value being one half of a voltage between said positive and negative busses;

first comparing means for, when said value output from said subtracting means is smaller than a second reference voltage value which is a negative value, turning on a signal for raising said neutral voltage;

second comparing means for, when said value output from said subtracting means is larger than a third reference voltage value which is a positive value, turning on a signal for lowering said neutral voltage;

insulating means for converting said two signals to a 2-bit digital signal in an insulative manner; and calculating means for, on the basis of said digital signal, calculating a neutral voltage control command, and outputting said command.

7. A neutral voltage controller which controls a neutral voltage that is a voltage between a neutral point of two capacitors connected in series between positive and negative busses of a three-level inverter apparatus, and said negative bus, characterized in that said neutral voltage controller comprises:

subtracting means for outputting a value which is obtained by subtracting a first reference voltage value from a value of said neutral voltage, said first reference voltage value being one half of a voltage between said positive and negative busses;

a comparator which outputs a 2-bit digital signal having different values in cases where said value output from said subtracting means is smaller than a second reference voltage value which is a negative value, where said value output from said subtracting means is larger than a third reference voltage value which is a positive value, and where said value output from said subtracting means is equal to or larger than said second reference voltage value and equal to or smaller than said third reference voltage value;

insulating means for outputting said bit digital signal in an insulative manner; and calculating means for, on the basis of said digital signal, calculating a neutral voltage control command, and outputting said command.

8. A neutral voltage controller which controls a neutral voltage that is a voltage between a neutral point of two capacitors connected in series between positive and negative busses of a three-level inverter apparatus, and said negative bus, characterized in that said neutral voltage controller comprises:

subtracting means for outputting a value which is obtained by subtracting a first reference voltage value from a value of said neutral voltage, said first reference voltage value being one half of a voltage between said positive and negative busses;

first comparing means for, when said value output from said subtracting means is smaller than a second reference voltage value which is a negative value, turning on a signal for raising said neutral voltage;

second comparing means for, when said value output from said subtracting means is larger than a third reference voltage value which is a positive value, turning on a signal for lowering said neutral voltage;

insulating means for converting said two signals in an insulative manner to a 2-bit digital signal; and storage means for previously storing a table of sets of a value of said digital signal and a neutral voltage control command which is to be output at said value, obtaining a neutral voltage control command which corresponds to said digital signal supplied from said insulating means, from said table, and outputting said neutral voltage control command.

9. A neutral voltage controller which controls a neutral voltage that is a voltage between a neutral point of two capacitors connected in series between positive and negative busses of a three-level inverter apparatus, and said negative bus, characterized in that said neutral voltage controller comprises:

subtracting means for outputting a value which is obtained by subtracting a first reference voltage value from a value of said neutral voltage, said first reference voltage value being one half of a voltage between said positive and negative busses;

a comparator which outputs a 2-bit digital signal having different values in cases where said value output from said subtracting means is smaller than a second reference voltage value which is a negative value, where said value output from said subtracting means is larger than a third reference voltage value which is a positive value, and where said value output from said subtracting means is equal to or larger than said second reference voltage value and equal to or smaller than said third reference voltage value;

insulating means for outputting said digital signal in an insulative manner; and storage means for previously storing a table of sets of a value of said digital signal and a neutral voltage control command which is to be output at said value, obtaining a neutral voltage control command which corresponds to said digital signal supplied from said insulating means, from said table, and outputting said neutral voltage control command.

10. A neutral voltage controller according to claim 9, wherein said storage means stores a plurality of said tables corresponding to operation statuses of an inverter, selects a table corresponding to a present operation status, from said tables, and outputs a neutral voltage control command corresponding to said digital signal with using said table.

11. A neutral voltage controller according to any one of claims 6 to 10, wherein a difference between said second and third reference voltage values is set to be larger than an amplitude of neutral voltage variation at a frequency which is three times an output frequency of said three-level inverter.

* * * * *